United States Patent
Wan et al.

(10) Patent No.: US 10,382,529 B2
(45) Date of Patent: Aug. 13, 2019

(54) DIRECTED GRAPH BASED SPAN COMPUTATION AND CONFIGURATION DISPATCHING

(71) Applicant: Nicira, Inc., Palo Alto, CA (US)

(72) Inventors: Da Wan, Beijing (CN); Jianjun Shen, Beijing (CN); Maxim Novikov, Mountain View, CA (US); Donghai Han, Beijing (CN); Hua Wang, Beijing (CN)

(73) Assignee: NICIRA, INC., Palo Alto, CA (US)

( * ) Notice: Subject to any disclaimer, the term of this patent is extended or adjusted under 35 U.S.C. 154(b) by 734 days.

(21) Appl. No.: 15/011,332

(22) Filed: Jan. 29, 2016

(65) Prior Publication Data
US 2017/0220697 A1 Aug. 3, 2017

(51) Int. Cl.
*H04L 29/08* (2006.01)
*H04L 12/751* (2013.01)
*H04L 12/715* (2013.01)

(52) U.S. Cl.
CPC .............. *H04L 67/10* (2013.01); *H04L 45/02* (2013.01); *H04L 45/64* (2013.01)

(58) Field of Classification Search
CPC ......... H04L 67/10; H04L 45/64; H04L 45/02; H04L 41/12; H04L 41/0893; H04L 41/0803; H04L 45/46
See application file for complete search history.

(56) References Cited

U.S. PATENT DOCUMENTS

| | | | |
|---|---|---|---|
| 9,755,965 B1 | 9/2017 | Yadav et al. | |
| 2006/0287842 A1* | 12/2006 | Kim | G01H 9/004 702/183 |
| 2014/0075002 A1* | 3/2014 | Pradhan | G06Q 30/0255 709/223 |
| 2014/0172939 A1* | 6/2014 | McSherry | G06F 17/30539 709/201 |
| 2015/0009808 A1* | 1/2015 | Bejerano | H04L 41/0659 370/228 |

(Continued)

OTHER PUBLICATIONS

Jin et al., "Dynamic Scheduling of Network Updates", Aug. 17-22 2014, ACM, SIGCOMM 14. (Year: 2014).*

(Continued)

*Primary Examiner* — Paul H Masur
*Assistant Examiner* — Michael K Phillips
(74) *Attorney, Agent, or Firm* — Adeli LLP

(57) ABSTRACT

A method of determining the span of logical entities in a network is provided. The method generates a directed graph. Each node of the graph corresponds to a logical network entity. Each edge of the graph has one or two directions. A direction from a first node to a second node identifies the first node as the source of span for the second node. The method determines the span of each node based on the direction of the edges of the directed graph. The method groups each set of nodes that are accessible by all other nodes in the set in a strongly connected group (SCC) sub-graph. The method generates a group node in a directed acyclic graph (DAG) to correspond to each SCC sub-graph in the directed graph. The method assigns the span of each SCC to the corresponding group node of the DAG.

21 Claims, 15 Drawing Sheets

(56) References Cited

U.S. PATENT DOCUMENTS

| | | | |
|---|---|---|---|
| 2015/0117216 A1* | 4/2015 | Anand | H04L 47/125 |
| | | | 370/236 |
| 2015/0154330 A1* | 6/2015 | Yachide | G06F 17/5022 |
| | | | 716/102 |
| 2015/0195126 A1* | 7/2015 | Vasseur | H04L 41/5025 |
| | | | 370/218 |
| 2016/0173338 A1* | 6/2016 | Wolting | H04L 41/145 |
| | | | 709/223 |
| 2016/0359705 A1* | 12/2016 | Parandehgheibi | H04L 63/1425 |
| 2017/0222873 A1* | 8/2017 | Lee | H04L 12/6418 |
| 2018/0331948 A1 | 11/2018 | Jiang et al. | |

OTHER PUBLICATIONS

Guo et al., "Traffic Engineering in SDN/OSFP Hybrid Network", 2014, IEEE Computer Society, 2014 IEEE 22nd International Conference on Network Protocols. (Year: 2014).*

* cited by examiner

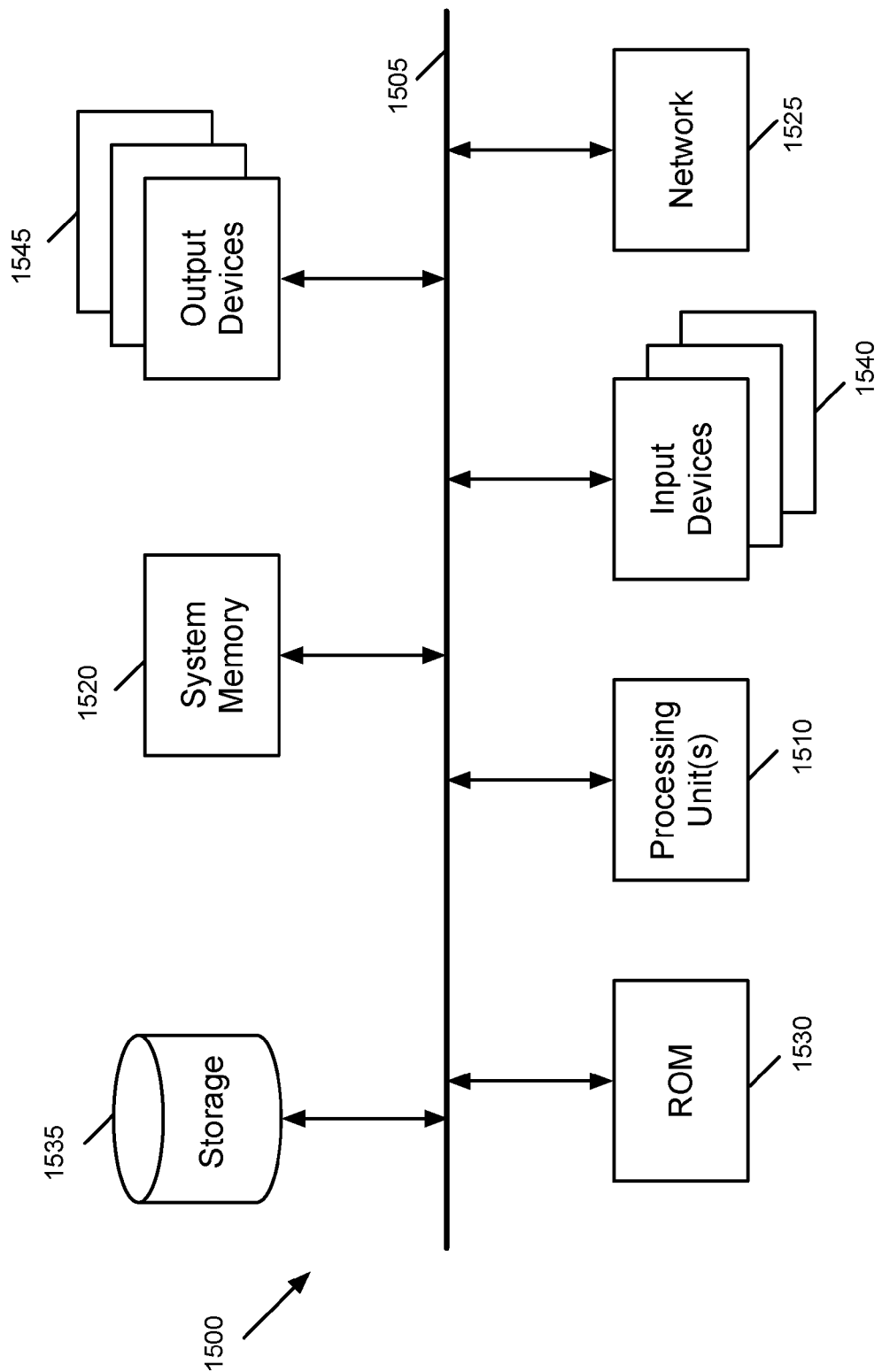

DIRECTED GRAPH BASED SPAN COMPUTATION AND CONFIGURATION DISPATCHING

BACKGROUND

Software defined networking (SDN) is one of the most indispensable parts of software defined data center (SDDC). In a traditional data center, networking devices such as switches, routers, etc., are physical entities and configuring these physical devices is somewhat obvious and straightforward. Network administrators need to first establish physical connectivity between these devices (e.g., by plugging cables between them) and then login and make the corresponding configurations.

SDN, on the other hand, provides an abstraction of physical networking infrastructure and gives birth to logical networking devices such as logical switches, logical routers, etc. Similar to physical networking devices, these logical devices provide functionalities that are close to physical ones and are transparent to virtual machines (VM) in the SDDC. Logical devices provide benefits that the physical devices could not furnish. For instance, logical devices could be linked with each other by just defining the topology configuration while physical devices need physical cables to be attached. Logical devices could be distributed entities while physical devices must be single entities. Since logical devices are software driven, distributed solutions are widely preferred and used by the SDN in the SDDC.

Distributed solutions, however, bring both benefits and difficulties. Taking a logical switch connected by VMs that are distributed on multiple physical hosts as an example, all these physical hosts should be aware of this logical switch in order to apply correct policies, make correct traffic encapsulation, establish correct connections, etc. Since VMs can migrate among hosts and VMs can disconnect from an existing logical switch and connect to another logical switch, it could be hard to determine which host should get configuration of this logical switch at runtime.

One simple idea for solving this problem may be pushing configuration of this logical switch to all hosts regardless of whether a host needs to know or not. This might be doable in theory but may not be feasible in practice. The reasons come from several aspects. First, there may be tens of thousands of logical switches in a SDDC, thus pushing configurations of all these logical entities to every host is a huge task and is time consuming. Second, configurations of these logical entities require large amount of memory. Therefore it is not feasible for every physical host to store all this duplicated information for data transportation. Configuring other logical devices such as logical routers and distributed firewalls also face similar challenges.

BRIEF SUMMARY

Some embodiments provide a method for dynamically pushing entity configurations to hosts by computing span of each entity and dispatching each entity configuration only to the hosts that the entity spans across. The span of an entity is defined as the list of the hosts that "need to know" about the entity (i.e., the hosts that require receiving the configuration of the entity in order to apply correct policies, make correct traffic encapsulation, establish correct connections, etc.).

The span of an entity is, therefore, the scope that the entity spans across. The scope in some embodiments is represented by a set of hosts and each entity is associated with a span.

The span of an entity is used to identify the set hosts that need the entity's configuration information. The entity configuration is then pushed to that set of hosts only.

Some embodiments generate an abstract model for determining the span of each entity. The abstract model represents the relationships between logical entities such as logical switches, logical routers, firewalls, etc., as a directed graph. Each set of the graph nodes that are mutually reachable by other nodes in the set are grouped as a strongly connected component (SCC) sub-graph. Each node in a SCC has the same span.

The directed graph is then converted to a directed acyclic graph (DAG) by assigning each SCC on the directed graph to a group node on the DAG. The use of a DAG eliminates the need to handle cycles in the graph. The span of each SCC in the directed graph is then assigned to the corresponding group node to save memory consumption. The span of each entity is then used to dispatch different configurations and properties of the entity to the hosts in the entity span.

In some embodiments, configurations are sent to the hosts on demand resulting in pushing only the necessary configurations. In some embodiments, incremental changes instead of full configurations are pushed down to hosts if only part of configurations of an entity is changed. The method is not restricted to a specific topology definition of network entities and serves as a universal method computing entity span and dispatching entity configurations.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 15 conceptually illustrates an electronic system with which some embodiments of the invention are implemented.

DETAILED DESCRIPTION OF THE INVENTION

Figure 1:
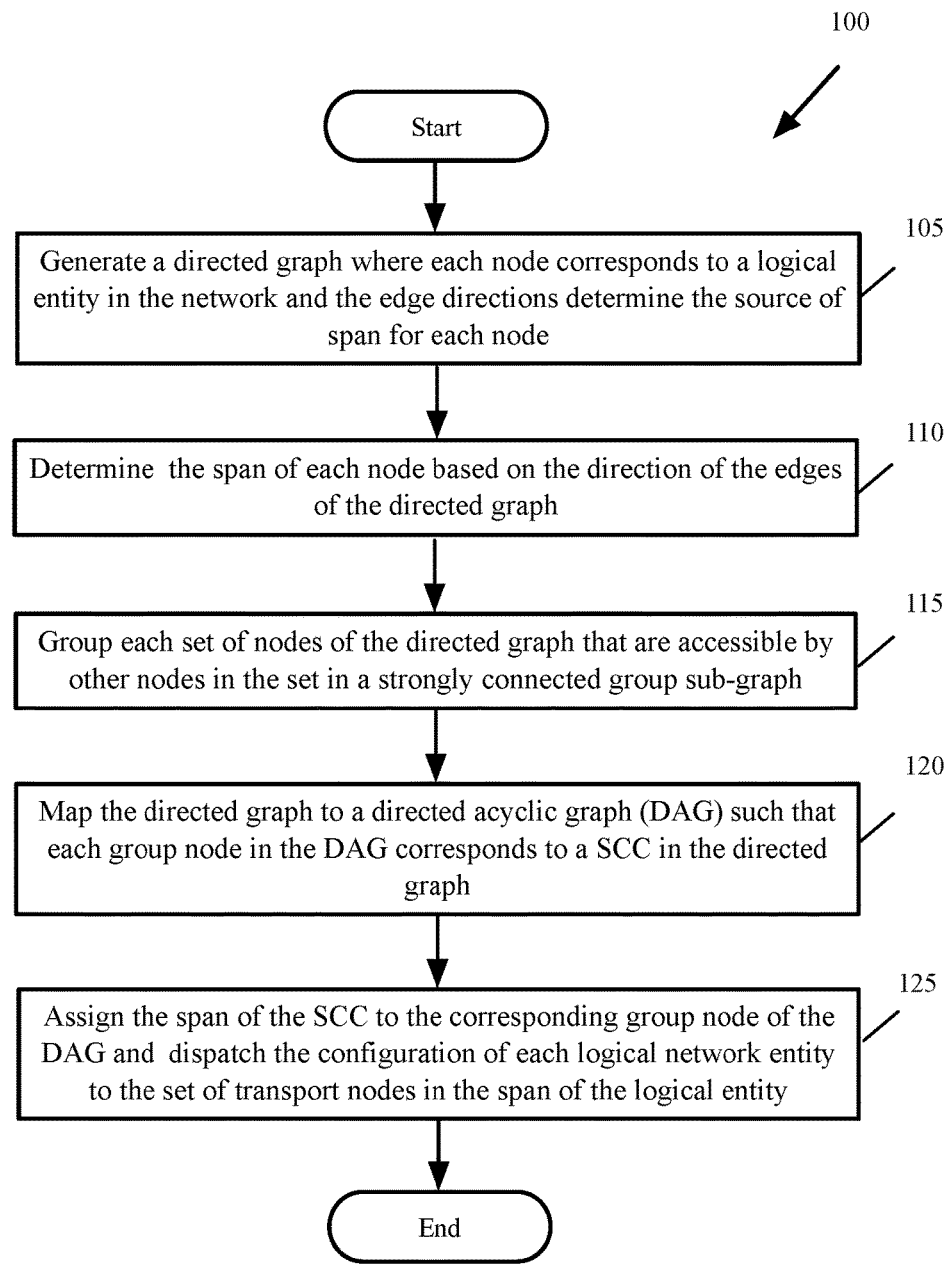
FIG. 1 conceptually illustrates a process for determining the span of logical entities of a network in some embodiments.

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments calculate the span of a logical entity and dispatch entity configurations only to the hosts that the entity spans across. Entity configurations in some embodiments are received from a management plane (MP) based on user actions that configure different entities to attach or detach. Entity configurations received from the MP includes several categories such as entity create, entity update, and entity delete.

Span computation for every entity is performed in order to dispatch the entity configuration to the corresponding set of hosts. In some embodiments, a centralized control plane (CCP) performs span computation and dispatches the configuration to the relevant hosts. A localized control plane (LCP) operating on each host receives these configurations for the host. In some embodiments, span computation is triggered after static entity configurations such as entity creation, entity deletion, entity property updates. The span computation can also be triggered after a discovered entity state such as the binding of a virtual interface (VIF) to a host.

In some embodiments, each host machine in the network includes virtualization software (e.g., a hypervisor) for virtualizing physical resources of the host machine and a host managed forwarding element (MFE) for forwarding network traffic (e.g., data messages) to and from the virtual machines. The host MFE, in some embodiments, operates within the virtualization software. In addition, some host machines include one or more VMs that connect to the host MFE.

In some embodiments, the host MFEs are configured to logically forward data messages according to logical forwarding elements configured by an administrator of the network (e.g., logical switches, logical routers) to implement a logical forwarding element (LFE) of a logical network. In some embodiments, the logical network is an abstract conception of a network generated by an administrator, and the logical network is implemented in a virtualized, distributed manner in a managed physical infrastructure (e.g., in a multi-tenant datacenter). That is, the VMs that connect to the LFEs may reside on various different host machines within the infrastructure, and MFEs (e.g., software virtual switches) operating on these host machines implement some or all of the logical forwarding elements (logical switches, logical routers, etc.).

In the virtualization field, some refer to software switches as virtual switches as these are software elements. However, in this specification, the software forwarding elements are referred to as MFEs, in order to distinguish them from LFEs, which are logical constructs that are not tied to the physical world. An MFE forwards packets in a physical network whether or not it is implemented in software while an LFE forwards packets in a logical network, which is logically decoupled or abstracted from the physical network. In other words, the software forwarding elements exist and operate in the physical world, whereas an LFE is a logical representation of a forwarding element that is presented to a user when designing a logical network.

I. Computation and Dispatch of Entity Span

Some embodiments calculate the span of a logical entity and dispatch entity configurations only to the transport nodes that the entity spans across. FIG. 1 conceptually illustrates a process 100 for determining the span of logical entities of a network in some embodiments. The process in some embodiments is performed by a central controller such as the CCP.

The network in some embodiments includes a set of logical entities and a set of transport nodes. A transport node is a host, a gateway, virtualization software, or any other network entity that may require receiving the configuration of other network entities. The span of each logical entity is the set of all transport nodes that require the configuration of the logical entity.

As shown, the process generates (at 105) a directed graph that includes several nodes and several edges. Each node of the directed graph corresponds to a logical network entity and each edge between a pair of nodes corresponds to a relationship between a pair of logical entities. Each edge is assigned one or two directions such that an edge direction from a first node to a second node identifies the first node as the source of span for the second node.

Next, the process determines (at 110) the span of each node based on the direction of the edges of the directed graph. The process then groups (at 115) each set of nodes of the directed graph that are accessible by other nodes in the set in a strongly connected group sub-graph. All nodes in a strongly connected group have the same span.

The process then maps (at 120) the directed graph into a directed acyclic graph (DAG) such that each group node in the DAG corresponds to a SCC sub-graph in the directed graph. The process assigns (at 125) the span of a node in each SCC to the corresponding group node of the DAG and dispatches the configuration of each logical network entity to the transport nodes in the span of the logical entity. The process then ends.

Process 100 provides a high-level description of a method of determining the span of logical entities of a network and dispatching of the entity configuration in some embodiments. Details of each operation of process 100 and several other detailed embodiments are described further below.

A. Definition of Span

Figures 2A, 2B:
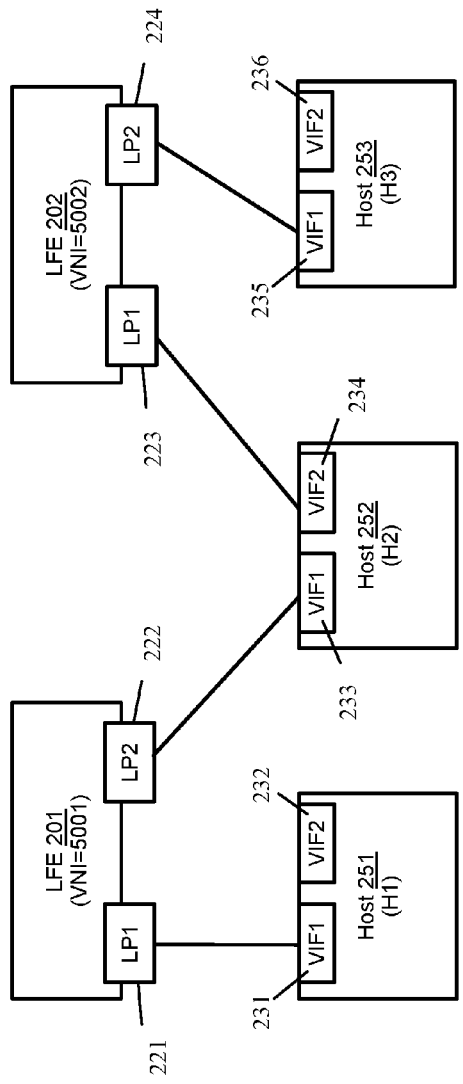
FIGS. 2A and 2B conceptually illustrate an example of determining the span of logical entities in some embodiments.

FIGS. 2A and 2B conceptually illustrate an example of determining the span of logical entities in some embodiments. The figure shows a simple scenario that only includes the deployment of LFEs. As shown, LFE 201 includes two logical ports LP 221 and LP 222 and is associated with a network identification such as virtual network ID (VNI) of 5001. LFE 202 also includes two logical ports LP 223 and LP 224 and is associated with the network identification (VNI) of 5002.

The figure also shows three transport nodes 251-253. The transport nodes in this example and in several other examples throughout this specification are physical hosts. It should be understood that the invention is applicable to other types of transport nodes such as gateways, virtualization software, or any other network entity that requires "to know of" and receive the configuration of other network entities.

As shown, each host 251-253 has two virtual interfaces (VIFs). Each VIF 231-236 is, e.g., a virtual network interface controller (VNIC) that connects a VM to an LFE port. Since the LFEs are distributed entities, in order to make VIF 231 on host 251 communicate with VIF 233 on host 252, host 251 needs to have knowledge of both LP 221 and LFE 201 and their corresponding configurations. Similarly, host 252 needs to have knowledge of both LP 222 and LFE 201. Host 252 also needs to have knowledge of LP 223 and LFE 202. Similar assertions can be made for host 253.

FIG. 2B shows a table 260 that defines the "needs to know" relationships between the hosts and different entities of FIG. 2A. An 'X' mark at the intersection of a row and a column in table 260 means that the host listed in the row "needs to know" about the entity listed in the corresponding column. But if one reads table 260 by column instead of by row, one finds that the table also defines a "spans across" relationship. The span is the scope that entities span across and the span of each entity could be represented by a set of hosts.

Specifically, column 261 indicates that LFE 201 spans across host 251 and host 252. Column 262 indicates that LP 221 spans across host 251. Column 263 indicates LP 222 spans across host 252. Column 264 indicates LFE 202 spans across hosts 252 and 253. Column 265 indicates LP 223 spans across host 252. Column 266 indicates LP 224 spans across host 253.

Accordingly, the span of an entity is defined as the list of the hosts (or other transport nodes) that "need to know" about the entity (i.e., the hosts that require receiving the configuration of the entity in order to apply correct policies, make correct traffic encapsulation, establish correct connections, etc.).

B. Abstract Model to Define Entity Spans

In order to dispatch the configuration of an entity to the hosts that the entity spans across, the span of the entity has to be calculated. Synthesizing FIGS. 2A and 2B shows that the span of LFE 201 is a combination of the span of ports 221 and 222. Similarly, the span of LFE 202 is the combination of the span of ports 223 and 224. Furthermore, if another VIF (e.g. VIF 234 on host 252) attaches to port 221, the spans of both port 221 and LFE 221 would change. Based on these findings and requirements, the model defining the span relationship between entities and how the changing of the span of one entity could affect the others can be abstracted out.

Figure 3:
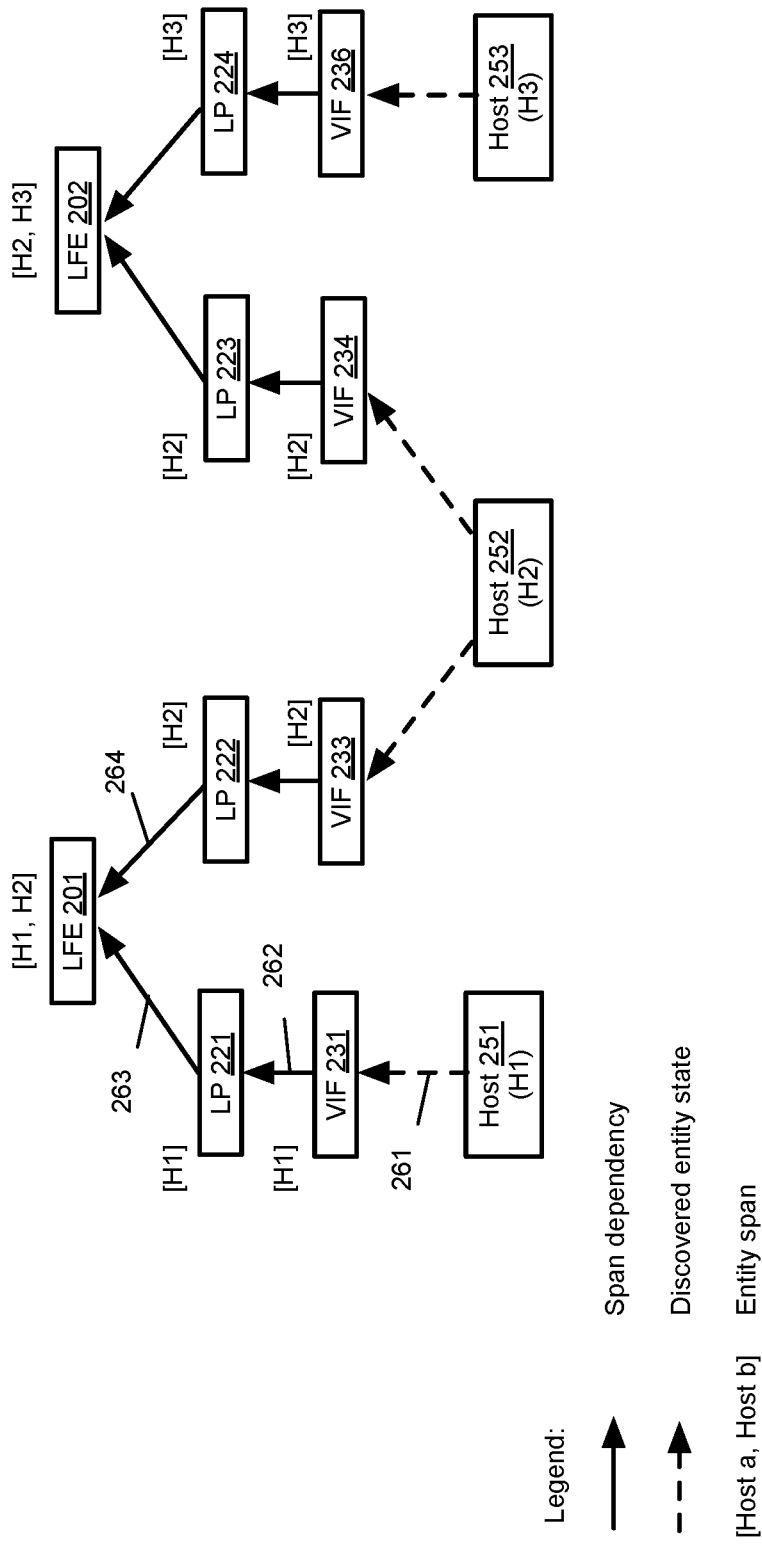
FIG. 3 illustrates a model that shows how the span between entities is related.

FIG. 3 illustrates a model that shows how the span between entities is related in some embodiments. The figure is an abstraction of the system of FIG. 2A. The "span dependency" arrows (shown as solid arrows in FIG. 3) indicate (1) how the span of one entity depends on others (i.e., which node is the source of the span for another node), and (2) how the change of the span of one entity affects the others. The "discovered entity state" arrows (shown as dotted arrows in the figure) indicate the source where span originates. The span of each entity is shown in brackets next to the entity.

VIF 231 is on host 251 and the span of VIF 231 is host 251 as shown by the dashed line 261. VIF 231 attaches to LP 221. The source span of LP 221 is, therefore, host 251. The figure further illustrates that the span of LP 221 depends on the span of VIF 231, as shown by span dependency arrow 262.

The figure also illustrates that the span of LFE 201 depends on the span of LP 221 and LP 222, as shown by span dependency arrows 263 and 264. Similar assertions can be made for other entities on the diagram.

Figure 4:
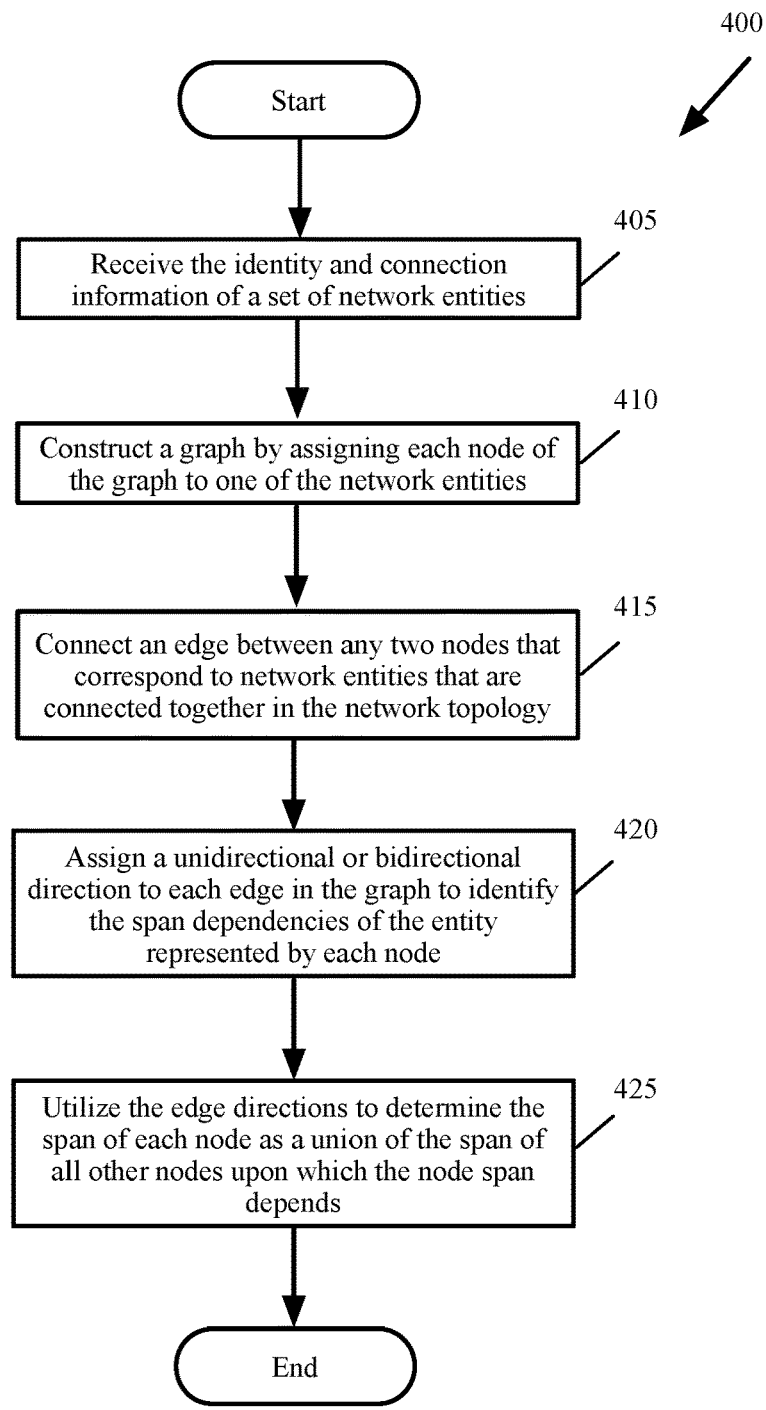
FIG. 4 conceptually illustrates a process for generating an abstract model for a set of network entities to compute the san of each entity in some embodiments.

FIG. 4 conceptually illustrates a process 400 for generating an abstract model for a set of logical network entities to compute the san of each entity in some embodiments. The process is performed by a central controller such as the CCP in some embodiments. As shown, the process receives (at 405) the identification and relationship information of a set of network entities. The network entities include logical switches, logical routers, ports, VIFs, etc. For simplicity other entities such as firewalls, etc., are referred to herein as logical network entities. The connection information includes the identity of other network entities logically connected to each entity. For instance, the process receives the identity of entities in FIG. 2A and the network topology, i.e., the manner the entities are connected to each other.

The process then constructs (at 410) a graph by assigning each node (or vertex) of the graph to one of the network entities. For instance, the process assigns each node of the graph in FIG. 3 to an entity in FIG. 2A. The process then connects (at 415) an edge between any two nodes that correspond to network entities that are connected together in the network topology. For instance the process connects the nodes of the graph in FIG. 3 based on the network configuration of the entities in FIG. 2A.

Next, the process assigns (at 420) a unidirectional or bidirectional direction to each edge in the graph to identify the span dependencies of the entity represented by each node. For instance, the process assigns directions to edges to the graph as shown by the unidirectional arrows in FIG. 3 or bidirectional arrows shown in FIG. 5, which is described below.

The process then utilizes (at 425) the edge directions to determine the span of each node as a union of the span of all other nodes upon which the node span depends. For instance, the process determines the span of LFE 201 as [H1, H2], which is the combination of the span of LP 221 (i.e., H1) and the span of LP 222 (i.e., H2) as shown in FIG. 3 or as described below by reference to FIG. 5. The process then ends.

C. Issues with a Simple Tree-Like Topology

In the above discussion, FIGS. 2A, 2B, and 3 were used to describe how span computation is done for LFEs. The figures utilize a tree-like topology with no bidirectional relationships between the nodes and no cycles. This tree-like topology, however, could bring difficulties when dealing with other logical entities such as logical routers. A logical router connects a set of LFEs to which VMs logically attach. Each LFE represents a particular set of IP addresses such as a subnet, and is implemented in the managed network across a set of MFEs to which the VMs physically connect (e.g., through virtual interfaces). In some embodiments, the logical routers are implemented in a distributed fashion as well by the MFEs that connect to the virtual machines.

Figure 5:
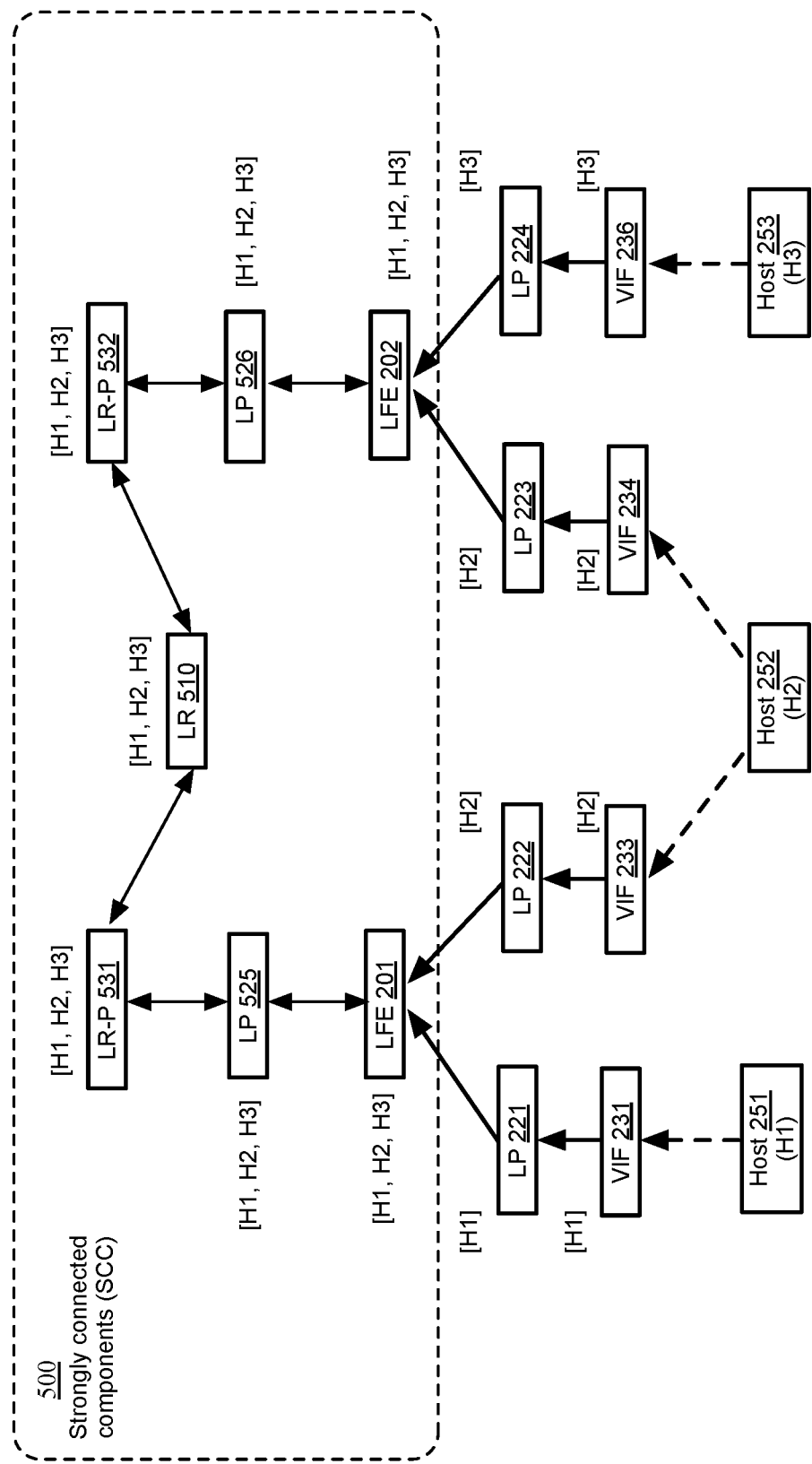
FIG. 5 illustrates an example that shows the issues for using a tree-like topology for calculating span.

FIG. 5 illustrates an example that shows the issues for using a tree-like topology for calculating span. In addition to the entities shown in FIG. 3, FIG. 5 shows a logical router 510. The logical router connects the two LFEs 201 and 202. Logical router 510 has two ports LR-P 531 and LR-P 532. Furthermore, LFE 201 has an additional port, LP 525, to connect to logical router port LR-P 531. Similarly, LFE 202 has an additional port, LP 526, to connect to logical router port LR-P 532.

Similar to calculation of the span for an LFE, calculation of the span for a logical router is a union of the span of all its ports as was mentioned above. However, calculation of the span for a logical router requires additional considerations than an LFE. Since logical router and LFE are both distributed entities, the data path implementation of a host requires not only the knowledge of the logical router and the LFE that the host directly connects, but also knowledge of the LFEs that connect to the logical router but do not directly connect to the host. This is because often there are several LFEs connected to a logical router and, therefore a logical router should span across the hosts where all LFEs span across. In other words, the span of a logical router is a union of spans of all LFEs connecting to it.

As shown, logical router 510 spans across hosts 251, 252, and 253. However, data path requires that entities on the upper left of graph (LFE 201, LP 525, and LR-P 531) span not only host 251 and host 252 but also host 253. Similarly, entities on the upper right of graph (LFE 202, LP 526, and LR-P 532) span not only host 252 and host 253 but also host 251. In order to calculate the span for these entities (entities within the dashed region 500), a bidirectional arrow is used to indicate the span dependencies among the entities. This leads to the fact that topology changes from a tree to a directed graph with cycles.

The following characteristics can be observed for the entities within the dashed region 500: (1) every entity in the region 500 is reachable from any other entity in the region; these entities form a strongly connected component (SCC) sub-graph, and (2) all entities in a SCC share the same span. For instance, all entities within the region 500 have the span of host 251, host 252, and host 253.

The above-mentioned characteristics introduce issues regarding memory consumption and graph cycles that must be addressed. A logical router may be connected to several LFEs. Furthermore, a logical router may connect to a higher level logical router or even sometimes many logical routers may connect to each other. This may result in all entities that are inter-connected by logical routers to span across many hosts and memory consumption for storing configuration for each entity becomes prohibitively high. Also, cycles in the graph may result in difficulties in span computation and graph traversal.

Figure 6:
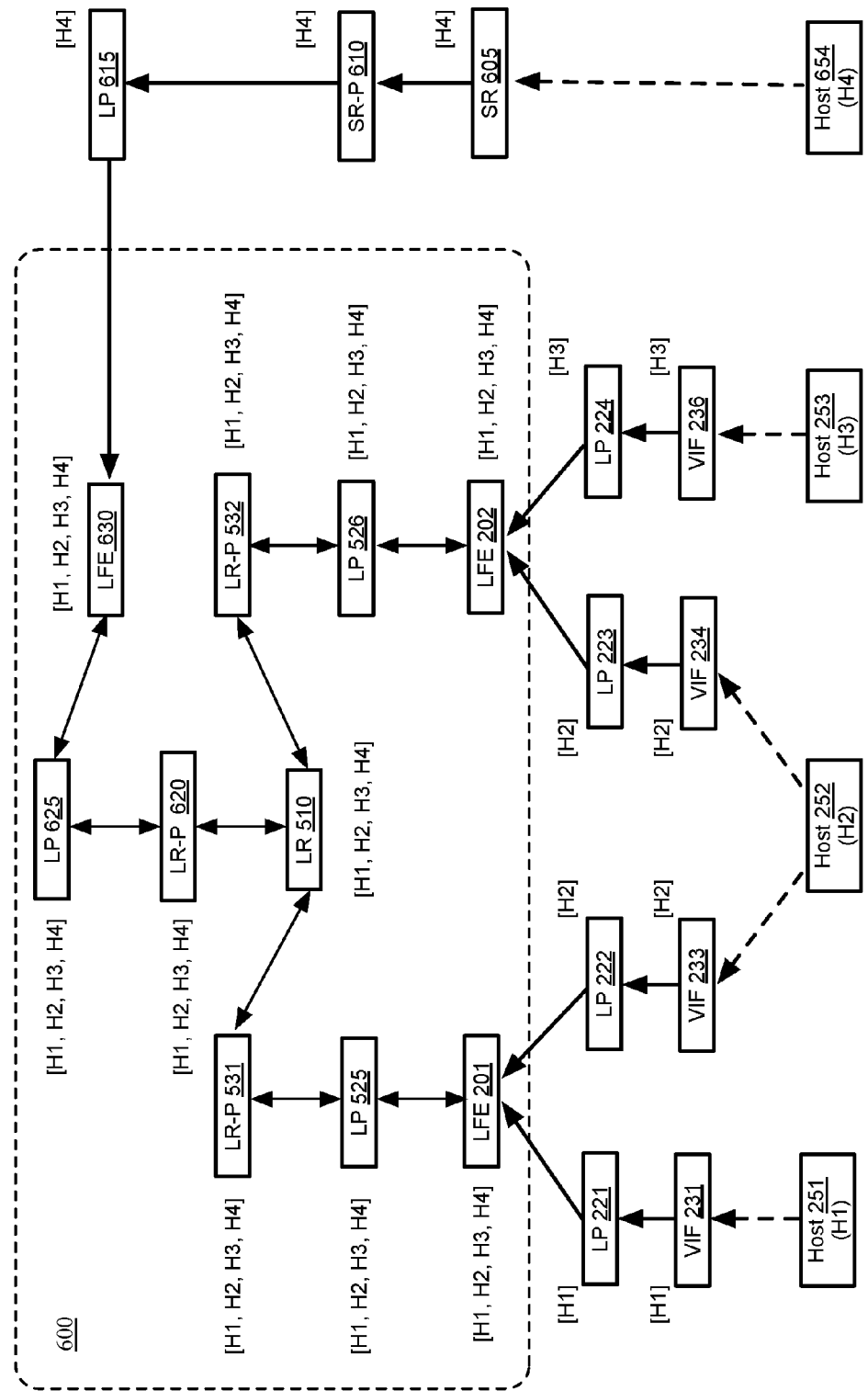
FIG. 6 illustrates an example that shows the issues for using a tree-like topology for calculating span when entities such as logical routers and service routers are used.

FIG. 6 illustrates another example that shows the issues for using a tree-like topology for calculating span when entities such as logical routers and service routers are used. FIG. 6 includes similar entities as FIG. 5. In addition, FIG. 6 includes a service router 605 that includes a port 610, a host 654, an LFE 630 that includes two ports 625 and 615. In addition, logical router 510 in FIG. 6 includes an additional port 620.

As shown, the span of the service router 605 is host 654 (H4). The span of service router port 610 and LFE port 615 is also H4 as shown by the span dependency arrows. LFE 630, LFE port 625, and logical router port 620 are all included in the SCC 600 as every node in SCC 600 is reachable from every other node in the SCC. All entities 201, 525, 531, 510, 620, 625, 630, 532, 526, and 202 share the same span, namely [H1, H2, H3, H4]. FIG. 6 introduces similar issues regarding memory consumption and graph cycles as FIG. 5 that must be addressed.

D. Optimized Directed Graph Based Model

In order to address the issues such as memory consumption and graph cycles mentioned above, some embodiments utilize a model based on SCC computation. In some of these embodiments, an algorithm for finding SCCs (e.g., Robert Tarjan's algorithm) is utilized and a directed graph is mapped into a directed acyclic graph (DAG).

Tarjan's algorithm partitions a directed graph into a set of SCCs. Each node of the graph is included in one of the SCCs. Any node that is not on a directed cycle with any other nodes (i.e., is not mutually accessible with one or more other nodes) forms an SCC by itself. The algorithm begins a depth-first search from an arbitrary node and visits each node once and considers each edge a maximum of two times. The algorithm's running time is a linear order of the number of nodes and edges of the graph. The algorithm creates a spanning forest (or a maximal acyclic sub-graph) of the graph and generates the SCCs as sub-graphs of the spanning forest. Further details of Targan's algorithm and the source code for implementing the algorithm can be found on the Internet.

Figure 7:
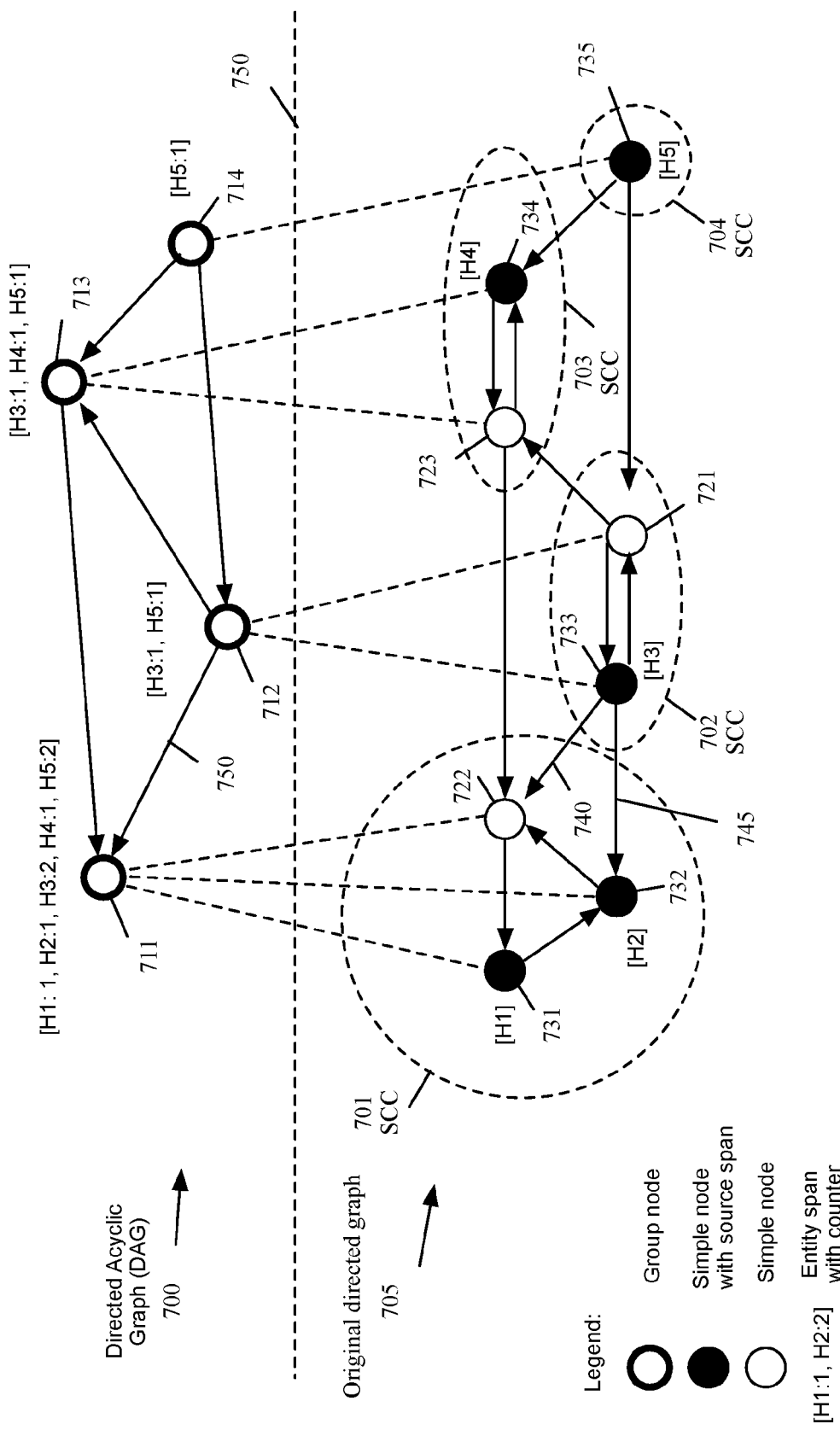
FIG. 7 conceptually illustrates an abstract model that some embodiments utilize to represent entities by mapping a directed graph into a directed acyclic graph.

FIG. 7 conceptually illustrates an abstract model that some embodiments utilize to represent entities by mapping a directed graph into a DAG. The original directed graph 705 is shown below the dotted horizontal line 750 and the DAG 700 is shown above the dotted horizontal line. The figure shows several different types of nodes.

A simple node (such as nodes 721-723, shown as thin boarder circles) represents a logical entity such as an LFE, logical router, LFE port, logical router, etc. All simple nodes and edges among them form a directed graph, which may include cycles. A simple node with source span (such as nodes 731-735, shown as solid circles) also represents a logical entity and is a type of node, such as a VIF, where span originates. A group Node (such as nodes 711-714, shown as thick boarder circles) is a DAG node that is created for each SCC of the directed graph 705. Since all entities within each SCC share the same span, span record is stored in the group nodes instead of simple nodes. All group nodes and edges among them form a DAG.

The figure also shows entity spans with counter. The span is represented by a set of hosts (e.g., H1, H2) inside brackets. The counter value associated with each host means how many sources this span comes from. For instance, group node 711 has span counter of 1 for host H1 because only one simple node associated with this group node has span H1. On the other hand, group node 711 has a span counter of 2 for host H3 because span H3 comes from two other predecessor group nodes 712 and 713 marked by the span dependency arrows (shown as solid span dependency arrows on the upper side of the graph above the dotted line 750).

As shown, sets of nodes that are strongly connected (i.e., each node in the set is reachable by all other nodes in the set) are grouped together as an SCC. For instance nodes 731, 722, and 732, which are all mutually reachable by each other, are grouped in an SCC 701. Similarly, nodes 733 and 721 are grouped into SCC 702, and nodes 723 and 734 are grouped into SCC 703. Node 735 that is not mutually reachable by any other nodes is placed by itself in an SCC 704.

In order to convert the directed graph 705 into the DAG 700, each SCC is assigned a single group node in the DAG. For instance, SCC 701 is assigned the group node 711, SCC 702 is assigned the group node 712, SCC 703 is assigned the group node 7113, and SCC 704 is assigned the group node 714.

Multiple edges (in the same direction) between simple nodes among different SCCs are merged into a single edge (in the same direction) among group nodes corresponding to each SCCs. For instance, edges 740 and 745 between SCCs 702 and 701 are merged into a single edge 750 between the corresponding group nodes 712 and 711. With the representation of this model, a directed graph is mapped into DAG where: (1) cycles are eliminated and span update based on span dependency arrow is performed only on group nodes, and (2) span of each SCC is stored in group node (instead of each individual node in an SCC) in order to reduce memory consumption.

The advantages of using a DAG include avoiding loops and reducing memory consumption to maintain span records. For instance, consider a network where 10,000 LFEs are connected to 10,000 hosts by a logical router. If each entity has its own span record and each record require 8 bytes, the total memory requirement to maintain the span records without using DAG would be 10,000*10,000*8 bytes, which equals to 800 MB. The use of DAG reduces the number of nodes that maintain span records and therefore reduces memory consumption.

Figure 8:
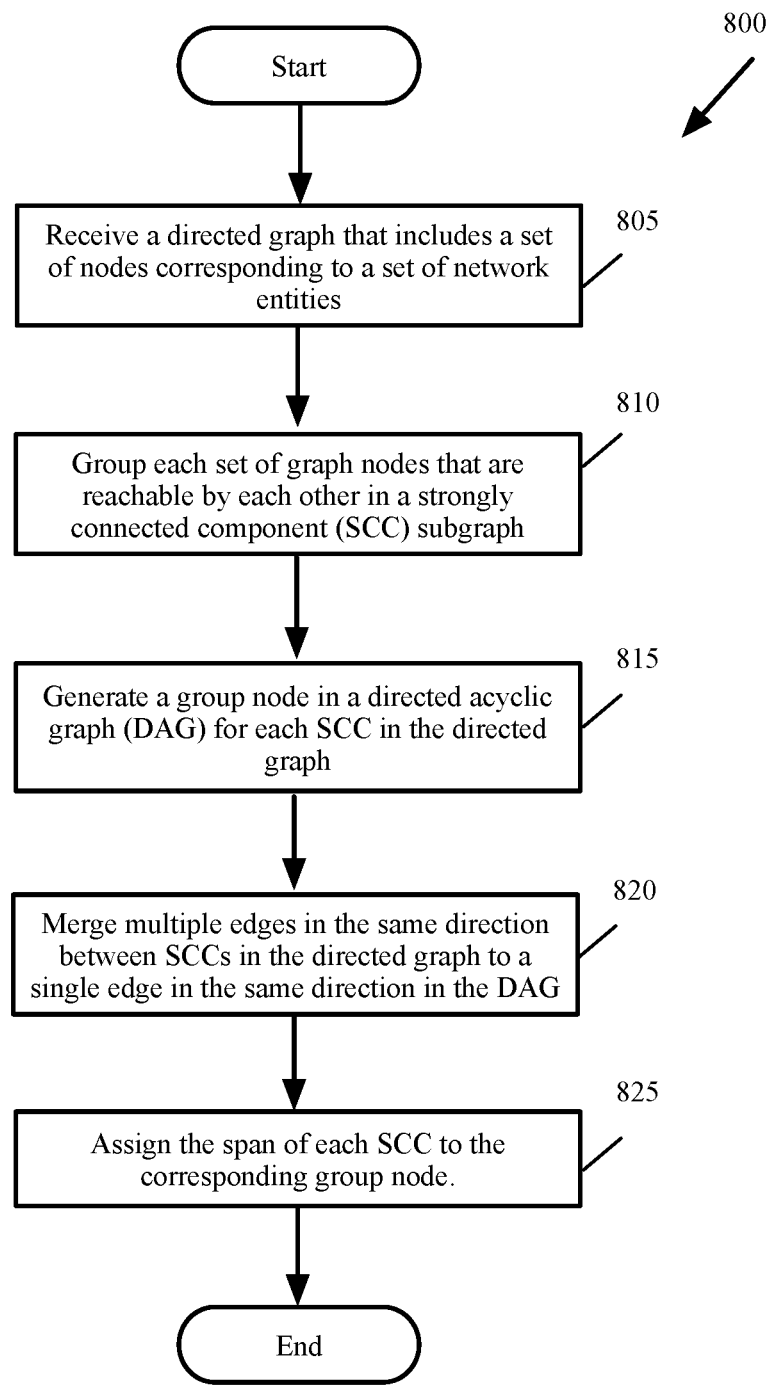
FIG. 8 conceptually illustrates a method for converting a directed graph to a DAG in some embodiments.

FIG. 8 conceptually illustrates a process 800 for converting a directed graph to a DAG in some embodiments. The process is performed by a controller such as the CCP in some embodiments. As shown, the process receives (at 805) a directed graph that includes a set of nodes corresponding to a set of network entities. For instance, the process receives directed graph 705 in FIG. 7.

Next, the process groups (at 810) each set of graph nodes that are reachable by each other in an SCC. For instance, the process groups nodes 731, 722, and 732, which are all reachable by each other, in an SCC 701 as shown in FIG. 7. When a node is not mutually reachable by any other node, the node is placed in an SCC by itself. For instance, node 735 in FIG. 7 is not mutually reachable by any other nodes and is placed in SCC 704 by itself.

Next, the process generates (at 815) a group node in a DAG for each SCC in the directed graph. For instance, the process generates node 711 for DAG 700 to correspond to SCC 701 of directed graph 705 in FIG. 7. The process then merges (at 820) multiple edges in the same direction between SCCs in the directed graph to a single edge in the same direction in the DAG. For instance, the process merges edges 740 and 745 between SCCs 702 and 701 of directed graph 705 into edge 750 between nodes 712 and 711 of DAG 700 in FIG. 7.

The process then assigns (at 825) the span of each SCC to the corresponding group node and stores the span at the group node. For instance, the process assigns the span SCC 701 and the associated counters (which is [H1:1, H2:1, H3:2, H4:1, H5:2]) in group node 711 as shown in FIG. 7. The process then ends.

E. Operations on the Model

Once the model is defined, there might be operations or changes on the graph, which are reflected by edge changes (adding or removing edges) or source span changes (hosts are added to or removed from span records) among simple nodes.

1. Adding Edges

If a new relationship (span dependency) is established between two simple nodes, the graph is updated by adding a new edge between the two simple nodes. For instance there could be an action like creating a new LFE port on an LFE or attaching a VIF to a LFE port, etc. These actions result in adding a new edge from LFE port to the LFE or from the VIF to LFE port. From the perspective of the graph model, however, this may result in the appearance of new SCC or the merging of several old SCCs into a larger SCC.

Figure 9:
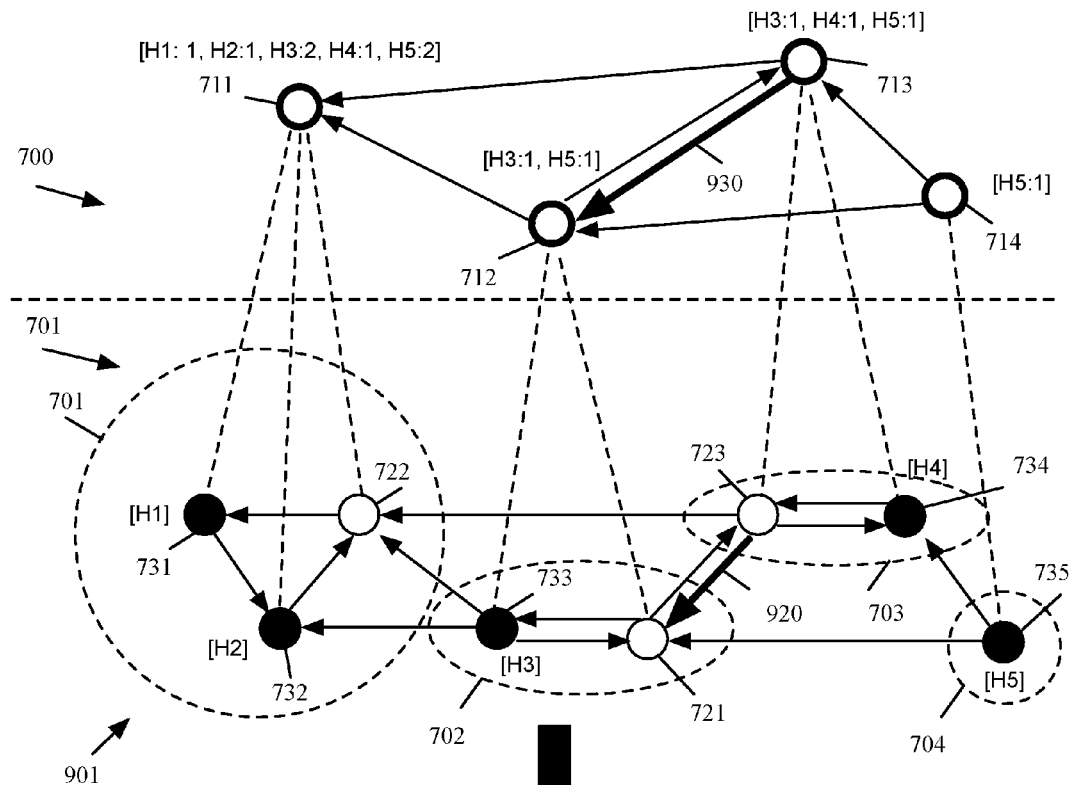
FIG. 9 illustrates an example where two SCCs are merged into a larger SCC in some embodiments.
Figure 9:
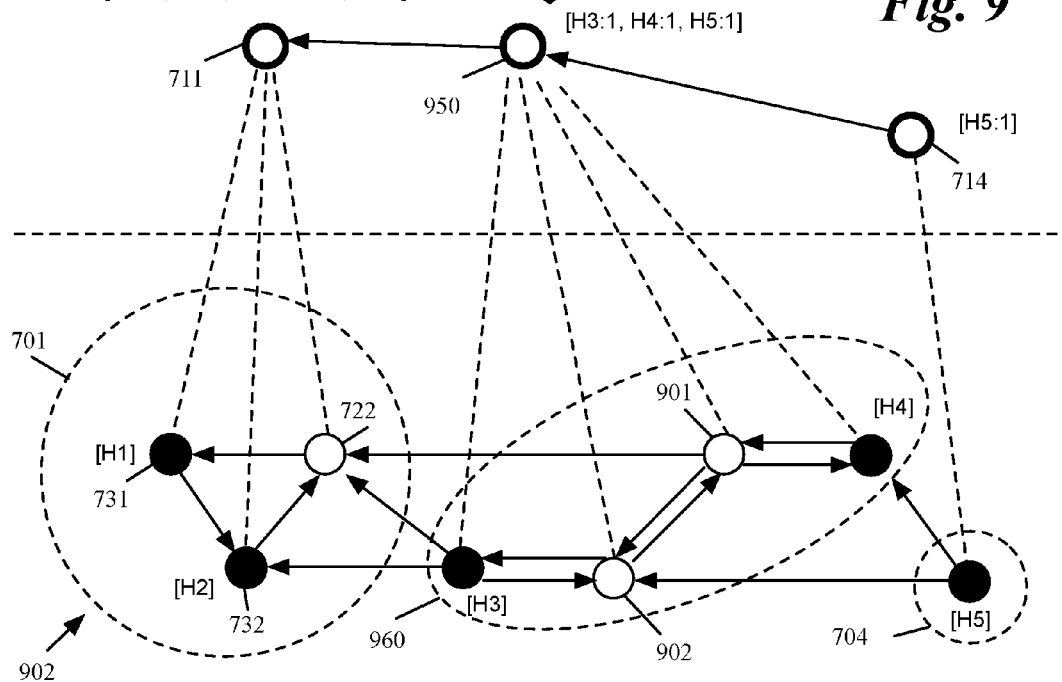

FIG. 9 illustrates an example where two SCCs are merged into a larger SCC in some embodiments. The figure is shown in two stages 901 and 902. Stage 901 shows graph 705 of FIG. 7 with four SCCs 701-704. The corresponding DAG 700 includes four group nodes 711-714. As shown, a new edge 920 is added between two simple nodes 723 and 721, which belong to different SCCs 703 and 702, respectively.

Since there is no directional edge exists from group node 713 to group node 712 that represent the two SCCs 703 and 702, a new edge 930 has to be added between the two group nodes 713 and 712. Adding edge 723 causes every entity in SCC 702 to become reachable from any entity in SCC 703 and vice versa. As a result, the existing two SCCs 702 and 703 become a new larger SCC and the two group nodes 712 and 713 have to be merged into a new group node.

Stage 902 illustrates the resulting graphs. As shown, a new SCC 960 is created from merging of SCCs 702 and 703. The two group nodes 712 and 713 in stage 901 are merged into a new group node 950. As the new SCC 960 is formed and a new group node 950 is created, the span record associated with the old group nodes are removed and a new span record associated with the new node 950 is recalculated.

Adding new edges, however, may not always result in the forming of new or larger SCCs. For instance, in stage 902 adding an edge from node 732 to node 731 does not result in merging of any SCCs. Checking for new SCCs (e.g., by running Tarjan's algorithm) is, therefore, required only when a new edge is added between two group nodes. Running the algorithm on group nodes is more efficient than running it on simple nodes because all group nodes and their edges were forming a DAG, and there are less group nodes and edges.

Figure 10:
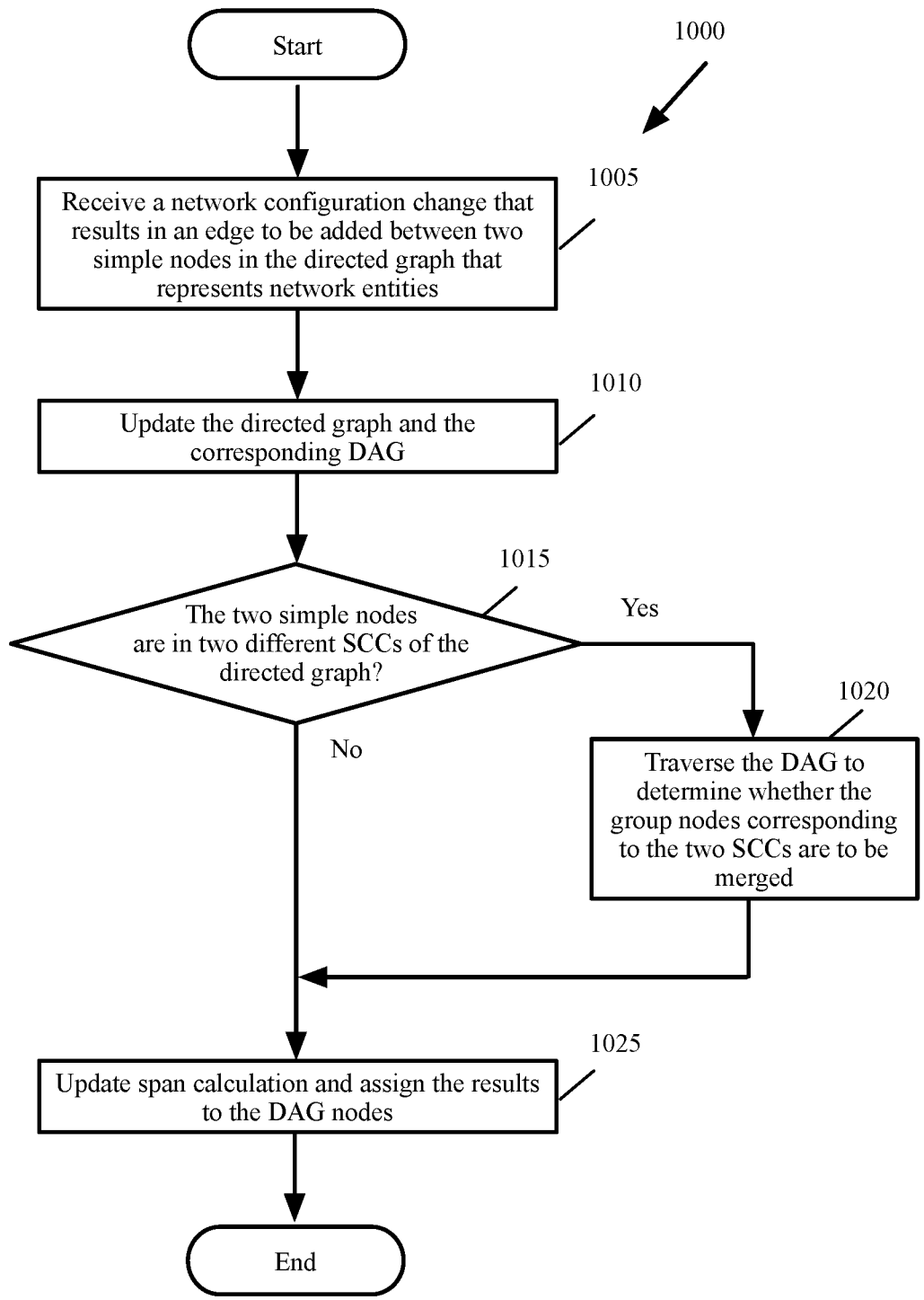
FIG. 10 conceptually illustrates a process for adding an edge between two simple nodes of a directed graph that represents a set of network entities in some embodiments.

FIG. 10 conceptually illustrates a process 1000 for adding an edge between two simple nodes of a directed graph that represents a set of network entities in some embodiments. The process in some embodiments is performed by a central controller such as the CCP.

As shown, the process receives (at 1005) a network configuration change that results in an edge to be added between two simple nodes in a directed graph that represents the network entities. For instance, the process receives (at the CCP from the MP) a configuration change that adds a new connection between two network entities.

The process then updates (at 1010) the directed graph and the corresponding DAG. For instance, the process updates the directed graph and the corresponding DAG as described above by reference to stage 901 in FIG. 9. The process then determines (at 1015) whether the two simple nodes are in two different SCCs of the directed graph. For instance, the process determines whether the two simple nodes 721 and 723 in FIG. 9 are in two different SCCs.

If not, the process proceeds to 1025, which is described below. Otherwise, the process traverses (at 1020) the DAG to determine whether the two group nodes corresponding to the two SCCs are to be merged. For instance, the process traverses the DAG as described in above by reference to FIG. 9 to determine whether the two SCCs 702 and 703 has to be merged.

The process then updates (at 1025) the span calculation and assigns the results to the DAG nodes. For instance, the process updates the span calculation as described above by reference to FIG. 9. The process then ends.

2. Removing Edges

Removing an edge between simple nodes is the reverse of adding edges. This may be caused by anything that could result in a relationship to be removed between logical entities (e.g. detaching a VIF from LFE port or removing an LFE port from an LFE, etc.). In contrast to adding edges, removing edges may result in an existing SCC to be decoupled into several smaller SCCs. In this case, an existing single group node is split into multiple ones.

Figure 11:
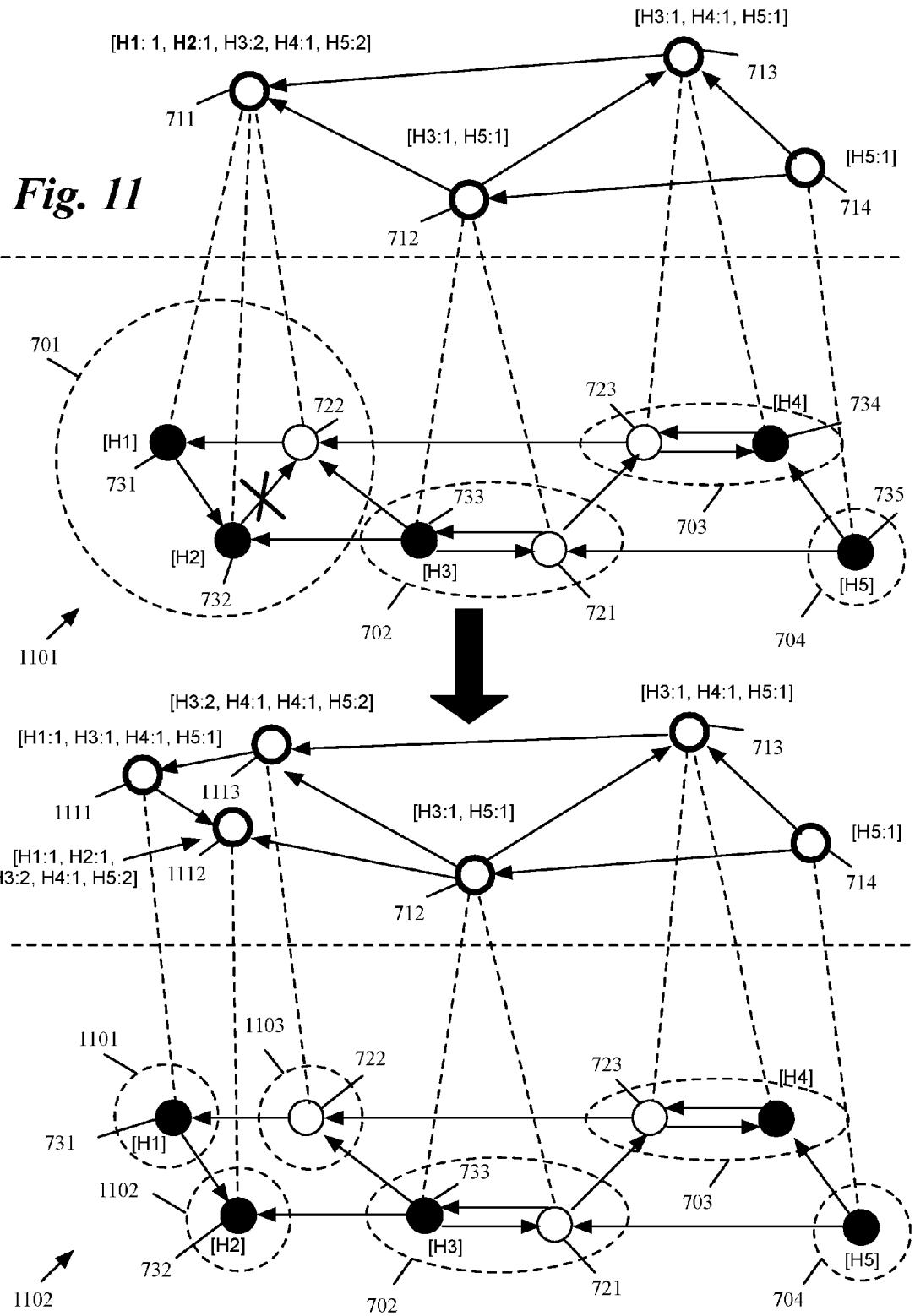
FIG. 11 illustrates an example where an SCC is split in several smaller SCCs after an edge between two nodes is removed in some embodiments.

FIG. 11 illustrates an example where an SCC is split into several smaller SCCs after an edge between two nodes is removed in some embodiments. The figure is shown in two stages 1101 and 1102.

Stage 1101 shows graph 705 of FIG. 7 with four SCCs 701-704. The corresponding DAG 700 includes four group nodes 711-714. As shown, an edge 1110 between nodes 732 and 722 is removed. Removing this edge results in node 722 not to be reachable from node 732. Nodes 731, 732, and 722, therefore, no longer form an SCC.

Stage 1102 shows that SCC 701 is split into three SCCs 1101-1103, each with a single node. Three new group nodes 1111-1113 are created in replacing the old group node 711 and edges among them are recreated. Span records of each group node are also recalculated based on the new topology.

Removing edges, however, may not always result in an SCC to split. Checking for split SCCs (e.g., by running Tarjan's algorithm) is executed on simple nodes (instead of executed on group nodes when adding an edge). Also, the algorithm needs to be executed only when the edge to be removed is an edge between simple nodes within the same SCC. Furthermore, as an improvement to Tarjan's algorithm, there is no need to traverse all simple nodes of the graph but only simple nodes within the same SCC.

Figure 12:
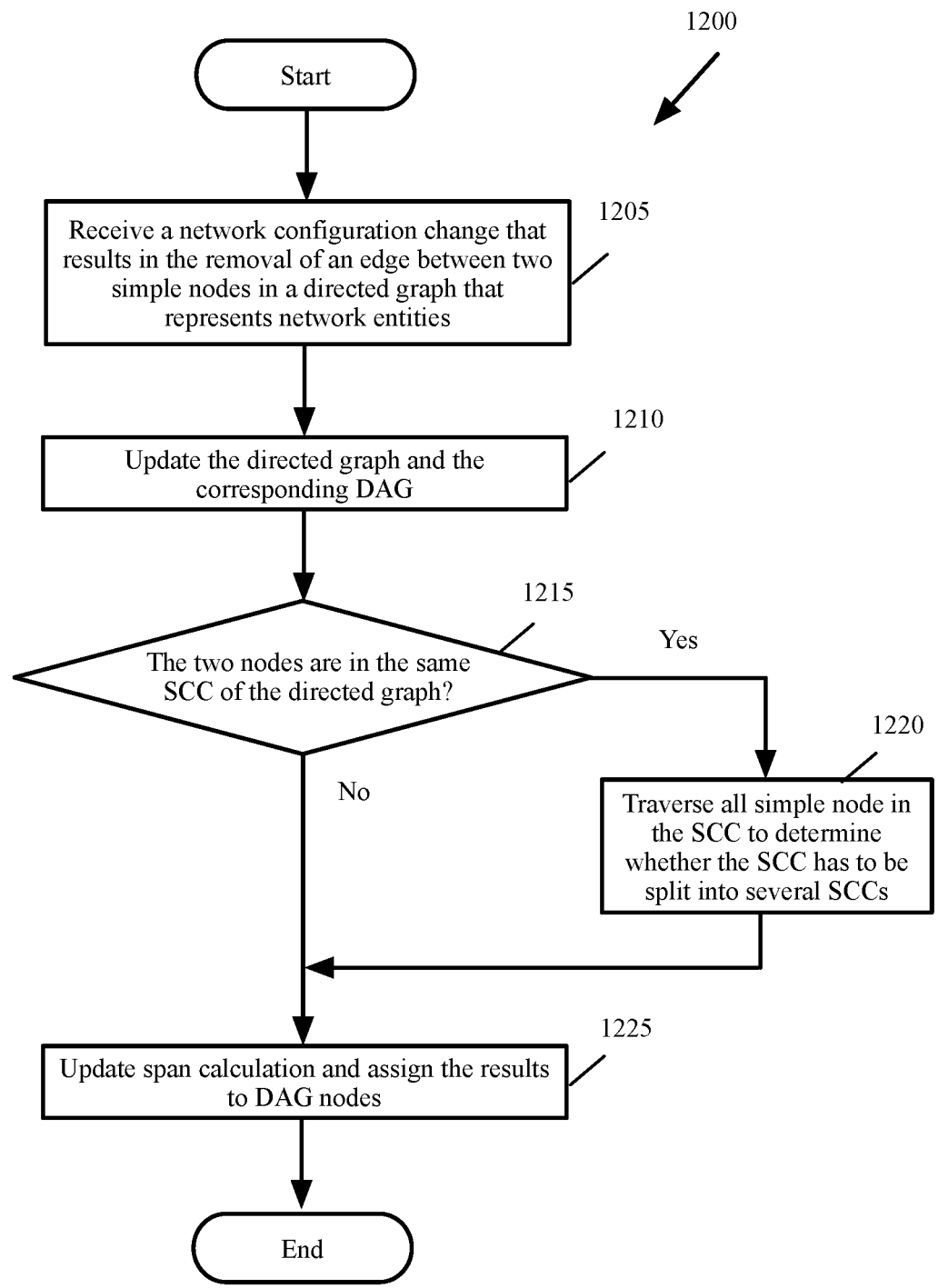
FIG. 12 conceptually illustrates a process for removing an edge between two simple nodes of a directed graph that represents a set of network entities in some embodiments.

FIG. 12 conceptually illustrates a process 1200 for removing an edge between two simple nodes of a directed graph that represents a set of network entities in some embodiments. The process in some embodiments is performed by a central controller such as the CCP.

As shown, the process receives (at 1205) a network configuration change that results in the removal of an edge between two simple nodes in a directed graph that represents the network entities. For instance, the process receives (at the CCP from the MP) a configuration change that removes an existing connection between two network entities.

The process then updates (at 1210) the directed graph and the corresponding DAG. For instance, the process updates the directed graph and the corresponding DAG as described above by reference to stage 1101 in FIG. 11. The process then determines (at 1215) whether the two simple nodes are in the same SCC of the directed graph. For instance, the process determines whether the two simple nodes 722 and 732 in FIG. 11 are in the same SCC.

If not, the process proceeds to 1225, which is described below. Otherwise, the process traverses (at 1220) all simple nodes of the SCC where the two simple nodes are located to determine whether the SCC has to be spilt into several SCCs. The process only traverses the nodes of the SCC that includes the two simple nodes. For instance, the process traverses all simple nodes in SCC 701 to determine whether the SCC has to be split into SCCs 1101-1103 as described above by reference to FIG. 11.

The process then updates (at 1225) the span calculation and assigns the results to the DAG nodes. For instance, the process updates the span calculation as described above by reference to FIG. 11. The process then ends.

3. Updating the Source Span

Some entities can be the source of span. One such entity is a VIF. In production environment, VIF to Host binding is discovered at runtime and only after a VIF appears on a specific host, it can be determined (1) which hosts this VIF spans across, (2) which hosts the LFE port attached by this VIF spans across, and (3) which hosts the LFE attached by that LFE port spans across. The VIF is, therefore, the source of span.

Figure 13:
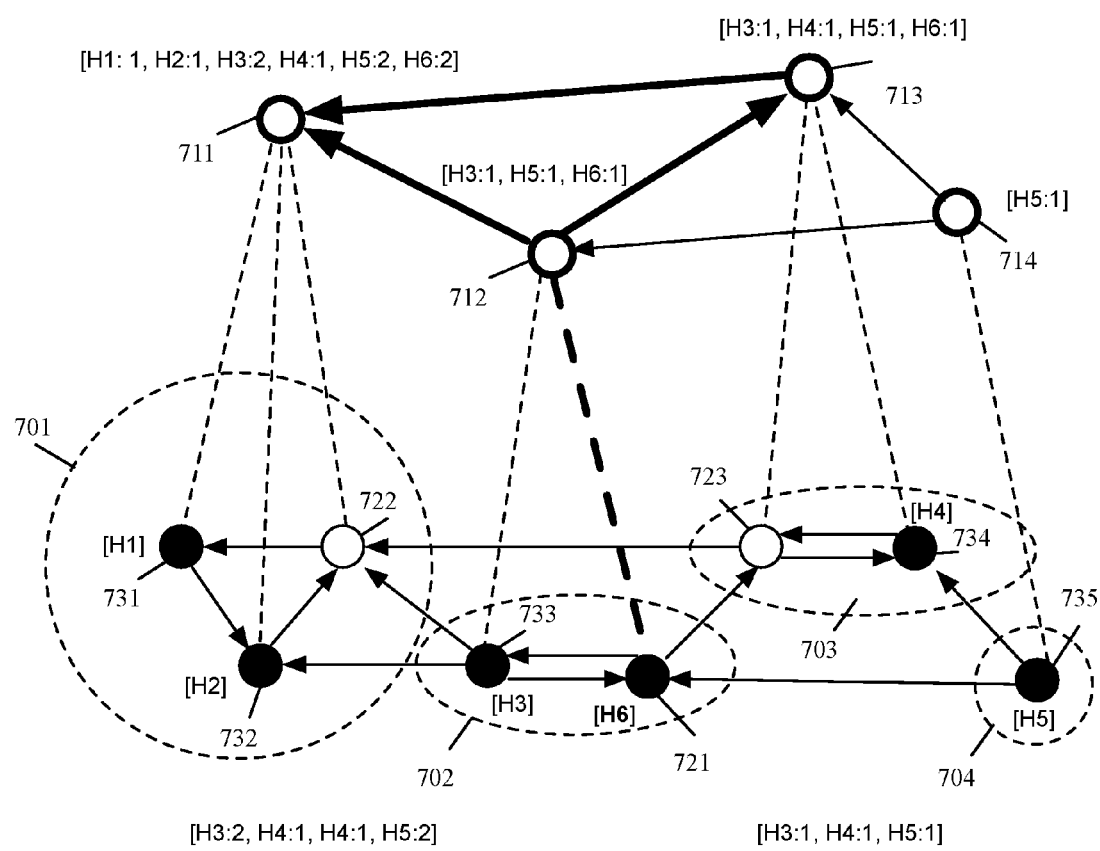
FIG. 13 shows an example scenario where a simple node is discovered with a new span in some embodiments.

From the perspective of the graph model, these are the nodes that only have successors, which means these nodes can only affect others in span but would never be affected by others. FIG. 13 shows an example scenario where a simple node is discovered with a new span in some embodiments. As shown, the binding of node 721 to host H6 is discovered.

After the node is marked as a node with source span H6, the span record of corresponding group node 712 is updated to include H6. Finally, a traversal over the other group nodes is performed to update span record H6 to other group nodes. As shown, the span of group node 713 is updated to include H6. Also, the span of group node 711 is updated to include H6 with a counter value of 2 since the source of H6 span for group node 711 comes from two other nodes 712 and 713.

F. Configuration Dispatch

Span computation for every entity is performed in order to be dispatched as entity configuration to the corresponding set of hosts. In some embodiments a centralized control plane (CCP) performs span computation and dispatches the configuration to the relevant host. A localized control plane (LCP) operating on each host receives these configurations for the host.

Entity configurations in some embodiments are received from a management plane (MP) based on user actions that configure different entities to attach or detach. Entity configurations received from MP is comprised of several categories such as entity create, entity update, and entity delete. Each entity could have zero or several properties associated with it. Entity property could also be divided into two types: reference property and non-reference property. Reference property indicates the relationship between this entity and others. For instance, when a VIF is configured to be attached to a LFE port, the LFE port would have a reference property of attachment specifying the corresponding VIF as the value. A non-reference property indicates a property only related to that entity itself. For instance, when an LFE is configured to have VNI 5001, the LFE would have a corresponding non-reference property specifying the VNI value.

The CCP uses reference property updates to update edges between nodes in graph in order to perform span computation. When a batch of configurations are received from MP, CCP uses the reference property changes to calculate span of each entity and notifies LCP about corresponding changes of that entity and its properties based on the result of span computation.

The following example illustrates the actions that the CCP performs in some embodiments when an entity span changes. When the span of an entity (e.g., entity X) changes from [H1, H2] to [H2, H3] and some properties of entity X also changes (e.g. the set of properties changes from [P1, P2] to [P2, P3]), then the CCP in some embodiments performs the following action: (1) if a new host was added into span record of an entity, the CCP sends the configuration of the entity and all its properties to that host. In this example, the CCP sends the creation of entity X and properties [P2, P3] to the LCP of host H3, (2) when an existing host was removed from the span record of an entity, the CCP notifies deletion of this entity to that host. In this example, the CCP notifies the deletion of entity X to the LCP of host H1, and (3) if some host was kept in the span record of an entity (e.g., host H2 remains in the span of entity X) and some properties of the entity changes, the CCP notifies deletion of old properties and the creation of new properties to that host. In this example, the CCP notifies the deletion of properties [P1] and the creation of [P3] to the LCP of host H2.

In some embodiments many entity configurations are pushed down from MP through CCP to LCP including VIF, container interface (CIF), LFE port, LFE, logical router port (distributed router port and service router port), logical router (distributed router and service router), bridge cluster (BC), service router cluster (SRC), transport zone (TZ), transport node (TN), distributed firewall (DFW) related components (e.g. policy profile, DFW security group), etc. Span computation addresses the scalability issues for memory as well as time for dispatching these entity configurations to the hosts.

G. Handling of Dangling References

In some embodiments, the order of messages received from the MP by the CCP for a transaction cannot be guaranteed and the messages can arrive at the CCP out of the order. In these embodiments, the CCP guarantees the order of the messages to be sent to the LCP by performing the followings. The entity creates message are sent to the LCP before the entity property update messages. No duplicate updates are sent to the LCP.

In addition, in order to update the directed graph and the corresponding DAG, the CCP performs the followings. All messages for a transaction from the MP are cached at the CCP. The CCP iterates all messages and creates all nodes required by the messages. The CCP iterates all messages again and updates span dependency relationship. All span changes are temporarily saved. The CCP iterates all messages again and deletes all nodes required by the messages. The CCP updates and stores the span changes.

A similar operation is performed for sending message from the CCP to the LCP to make sure there are no dangling references when the LCP receives updates from the CCP. When the span changes and the CCP needs to send entity configuration messages to the LCP, the CCP first sends entity creation messages to the LCP.

The CCP then sends properties updates to LCP (which may include creating relationships between entities or removing relationships between entities). The CCP then sends entities deletion messages to the LCP.

H. Container Support

Figure 14:
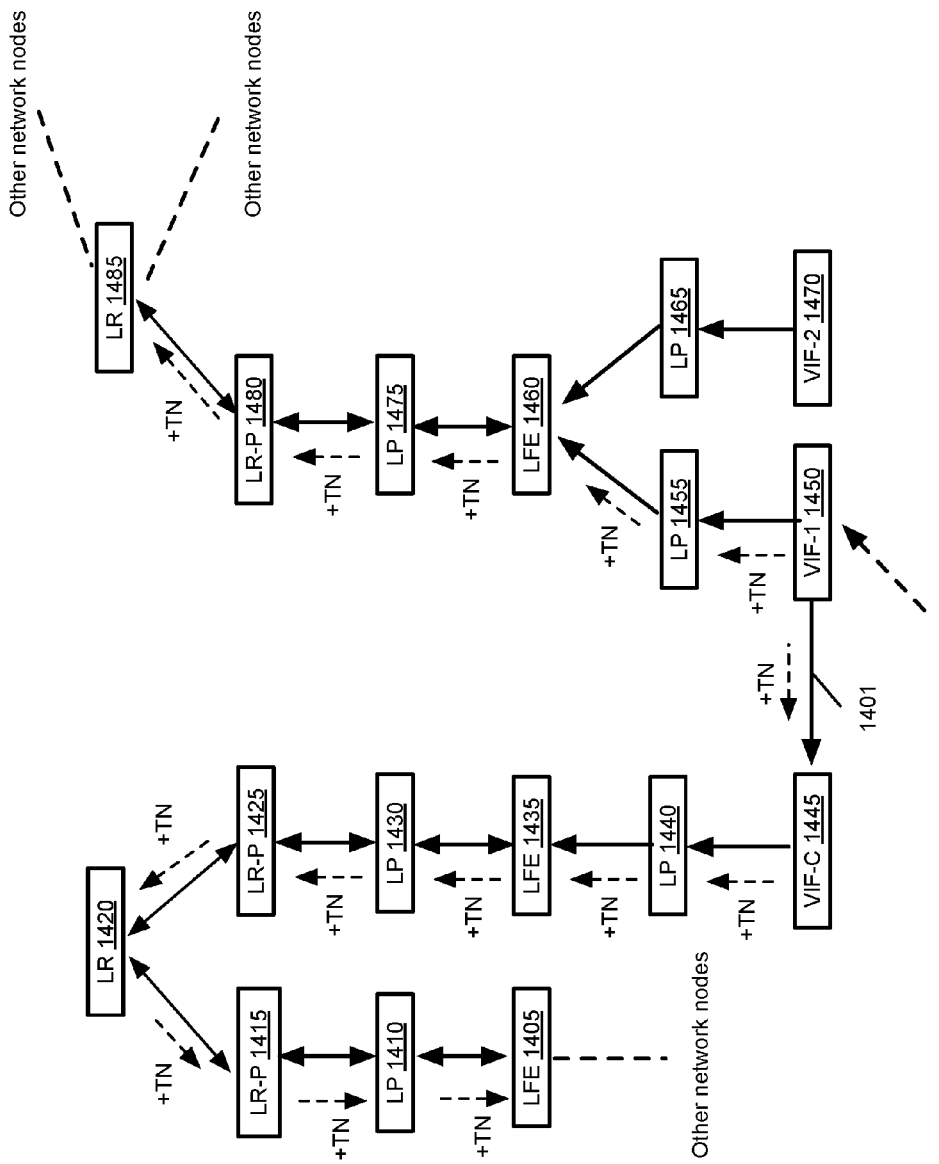
FIG. 14 conceptually illustrates updating the span calculation when a container is added to a VM in some embodiments.

Some embodiments provide support for running containers VMs inside another VM. FIG. 14 conceptually illustrates updating the span calculation when a container is added to a VM in some embodiments. The figure shows a VIF (VIF-1) 1450 that belongs to a VM referred to herein as VM-1 (the VM itself is not shown in the figure). The figure also shows a VIF (VIF-C 1445 that belongs to a container VM referred to herein as VM-C (the VM itself is not shown in the figure). The figure also shows another VIF (VIF-2) 1470, two logical routers 1420 (with ports 1415 and 1425) and 1485 (with port 1480), and three LFEs 1405 (with port 1410), 1435 (with ports 1430 and 1440), 1475 (with ports 1435, 1465, and 1460).

Consider the following configurations are made through the MP (shown with solid arrows). Container VM-C that includes VIF-C 1445 is connected to an LFE 1435 through a LFE port LP1440. The VM that includes VIF-1 1450 and hosts the container VM is connected to LFE 1460 through the LFE port LP 1435.

In order to inform the relationship between VIF-C and VIF-1, the MP also informs the CCP that VIF-1 is the NIC of VM-1 that hosts container VM-C which includes VIF-C 1445. This relationship is shown by arrow 1401.

When a transport node 1490 (such as a host, an LCP, a hypervisor, etc.) with ID TN1 connects to the CCP and reports that the transport node has VM-1 with NIC VIF-1 1450, the CCP uses the directed graph in FIG. 14 to update the entity spans in order to determine which entities' configuration has to be pushed to the transport node 1490. The figure shows the direction of span update (shown by dashed arrows and +TN). As shown, the span update is reflected to all relevant nodes 1405-1485 in the graph. The updated span is then used to determine which entities' configurations are needed by the transport node.

II. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 15 conceptually illustrates an electronic system 1500 with which some embodiments of the invention are implemented. The electronic system 1500 can be used to execute any of the control, virtualization, or operating system applications described above. The electronic system 1500 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1500 includes a bus 1505, processing unit(s) 1510, a system memory 1520, a read-only memory (ROM) 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the read-only memory 1530, the system memory 1520, and the permanent storage device 1535.

From these various memory units, the processing unit(s) 1510 retrieve instructions to execute and data to process in order to execute the processes of the invention. The processing unit(s) may be a single processor or a multi-core processor in different embodiments.

The read-only-memory 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive) as the permanent storage device 1535.

Other embodiments use a removable storage device (such as a floppy disk, flash drive, etc.) as the permanent storage device. Like the permanent storage device 1535, the system memory 1520 is a read-and-write memory device. However, unlike storage device 1535, the system memory is a volatile read-and-write memory, such as random access memory. The system memory stores some of the instructions and data that the processor needs at runtime. In some embodiments, the invention's processes are stored in the system memory 1520, the permanent storage device 1535, and/or the read-only memory 1530. From these various memory units, the processing unit(s) 1510 retrieve instructions to execute and data to process in order to execute the processes of some embodiments.

The bus 1505 also connects to the input and output devices 1540 and 1545. The input devices enable the user to communicate information and select commands to the electronic system. The input devices 1540 include alphanumeric keyboards and pointing devices (also called "cursor control devices"). The output devices 1545 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 15, bus 1505 also couples electronic system 1500 to a network 1525 through a network adapter (not shown). In this manner, the computer can be a part of a network of computers (such as a local area network ("LAN"), a wide area network ("WAN"), or an Intranet, or a network of networks, such as the Internet. Any or all components of electronic system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 1, 4, 8, 10, and 12) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In view of the foregoing, one of ordinary skill in the art would understand that the invention is not to be limited by the foregoing illustrative details, but rather is to be defined by the appended claims.

What is claimed is:

1. A method of determining a span of logical entities in a network comprising a set of logical entities and a set of transport nodes, the span of each logical entity comprising a set of transport nodes requiring configuration data for the logical entity, the method comprising:
   generating a directed graph comprising a plurality of entity nodes and a plurality of edges, each entity node corresponding to a logical network entity, each edge between a pair of entity nodes representing a relationship between a pair of logical network entities corresponding to the pair of entity nodes, each edge having one or two directions, wherein a subset of the entity nodes have assigned spans and an edge direction from a first entity node to a second entity node specifies that a span of the second entity node includes a span of the first entity node;
   determining a span of each entity node based on the direction of the edges of the directed graph and the assigned spans of the subset of the entity nodes;
   based on the determined spans, grouping entity nodes of the directed graph into a plurality of strongly connected group (SCC) sub-graphs such that (i) each entity node in each SCC is accessible from any other entity node in the SCC and (ii) each entity node in each SCC has a same span as each other entity node in the SCC;
   mapping the directed graph into a directed acyclic graph (DAG) by (i) generating a group node for each SCC sub-graph in the directed graph, (ii) assigning the span of each SCC to the corresponding group node of the DAG, and (iii) storing the span of each SCC as the span of the SCC's corresponding group node in order to avoid storing multiple copies of a same span record for each individual entity node in each SCC, thereby reducing the number of stored span records; and
   dispatching configuration data for each logical entity to the set of transport nodes in the span of the group node associated with the logical entity.

2. The method of claim 1, wherein a transport node is one of a physical host, a virtualization software executing on a physical host, and a network gateway.

3. The method of claim 1, wherein the span of each group node of the DAG comprises a set of counter values, wherein each counter value in the set of counter values represents a source for the span.

4. The method of claim 1 further comprising assigning a transport node as the span of a particular entity node of the directed graph that is in the subset of the entity nodes having assigned spans when the particular entity node of the directed graph is connected to another node of the directed graph that corresponds to the transport node, wherein determining the span of each entity node comprises setting the span of each entity node of the directed graph as a union of the spans of all entity nodes of the directed graph that have spans that are included in the span for the particular entity node.

5. The method of claim 1 further comprising:
   receiving a network configuration change resulting in an edge to be added between two entity nodes of the directed graph;
   updating the directed graph and the corresponding DAG based on the added edge;
   when the two entity nodes are in two different SCCs of the directed graph, traversing the DAG to determine whether the group nodes corresponding to the two SCCs are to be merged; and
   updating the directed graph and the DAG when the two SCCs are determined to be merged.

6. The method of claim 1 further comprising:
   receiving a network configuration change resulting in a removal of an edge between two entity nodes of the directed graph;
   updating the directed graph and the corresponding DAG based on the removed edge;
   when the two entity nodes are in a same SCC of the directed graph, traversing only the entity nodes in the SCC that includes the two entity nodes to determine whether the SCC is to be split into a plurality of SCCs; and
   updating the directed graph and the DAG when the SCC is determined to be split.

7. The method of claim 1, wherein at least one entity node in the subset of entity nodes having assigned spans represents a virtual interface (VIF) that attaches to a logical port of a logical switch, wherein determining the span of each entity node comprises determining that (i) the span of an entity node representing logical port includes the span of the entity node representing the VIF and (ii) the span of an entity node representing the logical switch includes the span of the logical port.

8. The method of claim 7, wherein the logical switch comprises a plurality of logical ports attached to VIFs operating on a plurality of transport nodes, wherein the determined span of the logical switch comprises the plurality of transport nodes.

9. The method of claim 1, wherein a particular group of entity nodes in a particular SCC comprises (i) an entity node representing a logical router and (ii) a plurality of entity nodes representing a plurality of logical switches that are connected to the logical router.

10. A non-transitory machine readable medium storing a program for determining a span of logical entities in a network comprising a set of logical entities and a set of transport nodes, the span of each logical entity comprising a set of transport nodes requiring configuration data for the logical entity, the program executable by a processing unit, the program comprising sets of instructions for:
   generating a directed graph comprising a plurality of entity nodes and a plurality of edges, each entity node corresponding to a logical network entity, each edge between a pair of entity nodes representing a relationship between a pair of logical network entities corresponding to the pair of entity nodes, each edge having one or two directions, wherein a subset of the entity nodes have assigned spans and an edge direction from a first entity node to a second entity node specifies that a span of the second entity node includes a span of the first entity node;

determining a span of each entity node based on the direction of the edges of the directed graph and the assigned spans of the subset of the entity nodes;

based on the determined spans, grouping entity nodes of the directed graph into a plurality of strongly connected group (SCC) sub-graphs such that (i) each entity node in each SCC is accessible from any other entity node in the SCC and (ii) each entity node in each SCC has a same span as each other entity node in the SCC;

mapping the directed graph into a directed acyclic graph (DAG) by (i) generating a group node for each SCC sub-graph in the directed graph, (ii) assigning the span of each SCC to the corresponding group node of the DAG, and (iii) storing the span of each SCC as the span of the SCC's corresponding group node in order to avoid storing multiple copies of a same span record for each individual entity node in a SCC, thereby reducing the number of stored span records; and dispatching configuration data for each logical entity to the set of transport nodes in the span of the group node associated with the logical entity.

11. The non-transitory machine readable medium of claim 10, wherein a transport node is one of a physical host, a virtualization software executing on a physical host, and a network gateway.

12. The non-transitory machine readable medium of claim 10, wherein the span of each group node of the DAG comprises a set of counter values, wherein each counter value in the set of counter values represents a source for the span.

13. The non-transitory machine readable medium of claim 10, wherein:

the program further comprises a set of instructions for assigning a transport node as the span of a particular entity node of the directed graph that is in the subset of the entity nodes having assigned spans when the particular entity node of the directed graph is connected to another node of the directed graph that corresponds to the transport node; and the set of instructions for determining the span of each entity node comprises a set of instructions for setting the span of each entity node of the directed graph as a union of the spans of all entity nodes of the directed graph that have spans that are included in the span for the particular entity node.

14. The non-transitory machine readable medium of claim 10, the program further comprising sets of instructions for:

receiving a network configuration change resulting in an edge to be added between two entity nodes of the directed graph;

updating the directed graph and the corresponding DAG based on the added edge;

when the two entity nodes are in two different SCCs of the directed graph, traversing the DAG to determine whether the group nodes corresponding to the two SCCs are to be merged; and updating the directed graph and the DAG when the two SCCs are determined to be merged.

15. The non-transitory machine readable medium of claim 10, the program further comprising sets of instructions for:

receiving a network configuration change resulting in a removal of an edge between two entity nodes of the directed graph;

updating the directed graph and the corresponding DAG based on the removed edge;

traversing, when the two entity nodes are in a same SCC of the directed graph, only the entity nodes in the SCC that includes the two entity nodes to determine whether the SCC is to be split into a plurality of SCCs; and updating the directed graph and the DAG when the SCC is determined to be split.

16. A system comprising:

a set of processing units; and non-transitory machine readable medium storing a program for determining a span of logical entities in a network comprising a set of logical entities and a set of transport nodes, the span of each logical entity comprising a set of transport nodes requiring configuration data for the logical entity, the program executable by a processing unit in the set of processing units, the program comprising sets of instructions for:

generating a directed graph comprising a plurality of entity nodes and a plurality of edges, each entity node corresponding to a logical network entity, each edge between a pair of entity nodes representing a relationship between a pair of logical network entities corresponding to the pair of entity nodes, each edge having one or two directions, wherein a subset of the entity nodes have assigned spans and an edge direction from a first entity node to a second entity node specifies that a span of the second entity node includes a span of the first entity node;

determining a span of each entity node based on the direction of the edges of the directed graph and the assigned spans of the subset of the entity nodes;

based on the determined spans, grouping entity nodes of the directed graph into a plurality of strongly connected group (SCC) sub-graphs such that (i) each entity node in each SCC is accessible from any other entity node in the SCC and (ii) each entity node in each SCC has a same span as each other entity node in the SCC;

mapping the directed graph into a directed acyclic graph (DAG) by (i) generating a group node for each SCC sub-graph in the directed graph, (ii) assigning the span of each SCC to the corresponding group node of the DAG, and (iii) storing the span of each SCC as the span of the SCC's corresponding group node in order to avoid storing multiple copies of a same span record for each individual entity node in each SCC, thereby reducing the number of stored span records; and dispatching configuration data for each logical entity to the set of transport nodes in the span of the group node associated with the logical entity.

17. The system of claim 16, wherein a transport node is one of a physical host, a virtualization software executing on a physical host, and a network gateway.

18. The system of claim 16, wherein the span of each group node of the DAG comprises a set of counter values, wherein each counter value in the set of counter values represents a source for the span.

19. The system of claim 16, wherein:

the program further comprises a set of instructions for assigning a transport node as the span of a particular entity node of the directed graph that is in the subset of the entity nodes having assigned spans when the particular entity node of the directed graph is connected to another node of the directed graph that corresponds to the transport node; and the set of instructions for determining the span of each entity node comprises a set of instructions for setting the span of each entity node of the directed graph as a union of the spans of all entity nodes of the directed graph that have spans that are included in the span for the particular entity node.

20. The system of claim 16, the program further comprising sets of instructions for:
receiving a network configuration change resulting in an edge to be added between two entity nodes of the directed graph;
updating the directed graph and the corresponding DAG based on the added edge;
when the two entity nodes are in two different SCCs of the directed graph, traversing the DAG to determine whether the group nodes corresponding to the two SCCs are to be merged; and
updating the directed graph and the DAG when the two SCCs are determined to be merged.

21. The system of claim 16, the program further comprising sets of instructions for:
receiving a network configuration change resulting in a removal of an edge between two entity nodes of the directed graph;
updating the directed graph and the corresponding DAG based on the removed edge;
traversing, when the two entity nodes are in a same SCC of the directed graph, only the entity nodes in the SCC that includes the two entity nodes to determine whether the SCC is to be split into a plurality of SCCs; and
updating the directed graph and the DAG when the SCC is determined to be split.

\* \* \* \* \*